United States Patent Office 3,223,015
Patented Dec. 14, 1965

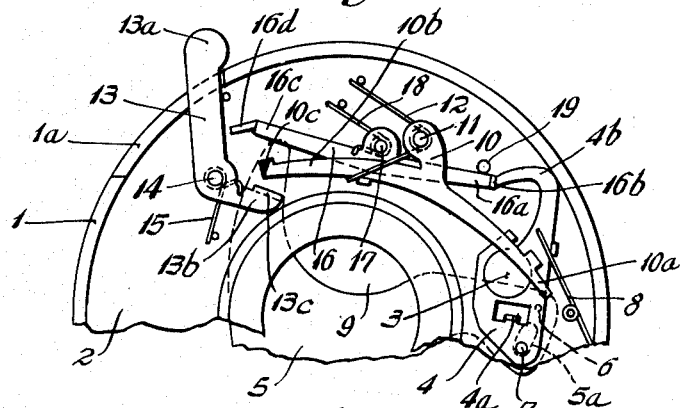
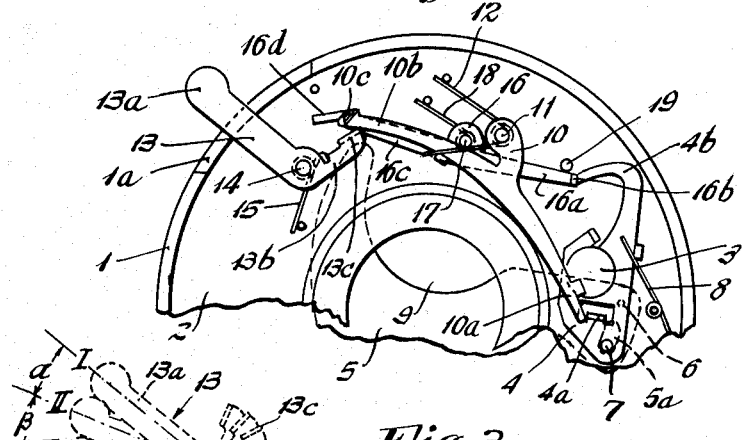
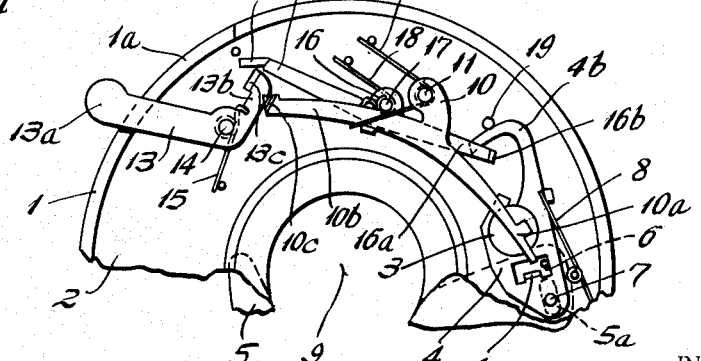

3,223,015
PHOTOGRAPHIC SHUTTER
Waldemar T. Rentschler and Karl F. Helber, Calmbach (Enz), and Helmut Straub, Hofen (Enz), Germany, assignors to Alfred Gauthier, G.m.b.H., Calmbach (Enz), Germany, a corporation of Germany
Filed Aug. 31, 1962, Ser. No. 220,727
Claims priority, application Germany, Sept. 16, 1961, G 33,141
6 Claims. (Cl. 95—62)

This invention relates to photographic shutters and, more particularly, to self-cocking shutter constructions of the type wherein operative movement of a cocking and release device is transmitted to a driving member which thereupon operatively engages a shutter blade actuator to cause the shutter blades to open and close.

Heretofore, in cameras provided with the foregoing type of photographic shutter structure, operative movement of the cocking and release device causes it to engage a driving member which is thereby moved unidirectionally and cocks the drive spring associated therewith. Upon further movement, the cocking and release device becomes disengaged from the driving member and the driving member, under the influence of the drive spring, returns to its initial or starting position. The return movement of the driving member is transmitted by intermediate means to the shutter blade actuator whereupon the shutter blades are opened and closed. Cameras of this type have been so constructed that the means for opening the shutter blades are in position for actuation at the time that the cocking motion of the driving member has been accomplished and before the driving member becomes disengaged from the cocking and release device. Any return movement of the cocking and release device at this time, either by its release by the photographer or through inadvertent return movement thereof, results in the return movement of the driving member under the influence of the spring to its initial or starting position. The means for actuating the shutter being in active position at this time, this return movement of the driving member is transmitted to the shutter blade actuator whereupon the shutter blades will open and close. Consequently, with this type of shutter construction, the shutter blades have opened and closed at an improper time.

It is an object of the present invention to provide a shutter construction in which there can be no unintentional or inadvertent opening of the exposure aperture by the shutter blades and wherein the movement of the shutter blades is completely and dependably under the control of the photographer.

It is a further object of the present invention to provide means for preventing the unintentional release of the exposure aperture by the shutter blades, which means are positive in operation, simple in construction, and completely dependable.

In accordance with the present invention, the foregoing objects are attained by the provision of a novel and efficient arresting member which maintains the shutter blade actuator in such position that the shutter blades remain closed after the cocking and release device has become disengaged from the driving member. This is accomplished by the provision of cooperable, operatively engaging means on the arresting member and on the cocking and release device whereby the movement of the cocking and release device is transmitted to the arresting member to disengage the arresting member from the shutter blade actuator only after the cocking and release device has completed its cycle and released the driving member.

The shutter construction of the present invention is such that any inadvertent release or return movement of the cocking and release device during the operation has no effect on and does not cause any movement of the shutter blades for the reason that during the operation or release process the shutter blade actuator is maintained by the arresting member in position wherein the shutter blades are closed. With the use of the present invention, movement of the shutter blades occurs only after the cocking and release device has been moved positively to the extent that it release the driving member and, therefore, no inadvertence or mistake on the part of the photographer can cause an exposure to be made at an improper time and thereby precise and proper exposures are assured at all times.

The arresting member of the present invention is in operative association with the shutter blade actuator independently of the driving member, and as a result, it is not necessary to provide any special or independent adjustment of the arresting member with respect to the driving member. In this connection, the operative parts are so arranged that a safety or lapsed-time path is provided between the time when the cocking and release device is disengaged from the driving member and the time when the cocking and release device is disengaged from the arresting member and prior to the activation of the means for opening the shutter blades. As a consequence, errors in tolerance which may occur in the mass production of the foregoing parts of the shutter structure have no effect on the operation of the shutter construction of the present invention. The arresting member provided by the present invention assures an efficient and dependable operation of the shutter, preventing unintentional exposures as well as being extremely economical to manufacture and produce.

In the embodiment of the present invention hereinafter described for illustrative purposes, the arresting member may preferably comprise a two-armed lever. One arm of the lever engages the shutter blade actuator while the other arm engages the cocking and release device. This type of arresting member is extremely simple and economical to manufacture and produce and does not require any adjustment or change in the normal arrangement of the cocking and release device or of the shutter blade actuator.

The invention, its objects and advantages, are described in greater detail in the following description of the invention and the drawings which illustrate, for exemplary purposes, one embodiment of the invention.

In the drawings,

FIG. 1 is a fragmentary front view partly in elevation and partly in vertical section showing the self cocking shutter construction of the present invention with the cover plate removed. The shutter is shown in its rest position.

FIG. 2 is a view similar to that of FIG. 1 but illustrating the position of the parts during the shutter release process immediately after movement of the cocking and release device.

FIG. 3 is a view similar to that of FIGS. 1 and 2 but showing the position of the parts after the release and while the shutter blades are in open position.

FIG. 4 is a diagrammatic view showing the relative positions of the cocking and release device during different phases of the release process.

As illustrated in the drawings, the photographic self cocking shutter is contained within a housing 1 which is provided with a slotted portion 1a. A base plate 2 is secured to the housing in a well-known manner and carries the various parts of the shutter structure. A shaft 3 on the base plate 2 supports a shutter blade actuating lever 4 which is provided with a bent-off lug 4a and a U-shaped projection 4b. The shutter blades 5 located on the rear of the base plate 2 are actuated by the lever 4. While there are two shutter blades, only one is shown for clarification purposes and, as illustrated, the shutter blades 5 are provided with slots 5a and fixed supporting pins 6. A pin 7 secured to and carried by the lever 4 is accommodated within the slot 5a in the shutter blades 5.

A spring 8 normally influences the lever 4 and maintains the said lever in the position illustrated in FIG. 1, in which the shutter blades are in closed position with the shutter construction at rest. It will be understood that swinging counterclockwise movement of the shutter blade actuating lever 4 causes the shutter blades to be moved into open position, as illustrated in FIG. 3, in which the exposure aperture 9 of the shutter is opened.

A two-armed driving lever 10 is supported on the base plate 2 and disposed around the pin 11. The driving lever 10 is influenced for movement in a counterclockwise direction by the drive spring 12 and such movement is transmittable to the shutter blade actuating lever 4.

One arm 10a of the driving lever operatively engages the lug 4a of the shutter blade actuating lever 4 in the manner and for the purposes hereinafter described. The other arm 10b of the driving lever 10 is provided with an offset end portion 10c and engages, also in the manner hereinafter set forth, the cocking and release device which is illustratively constructed in the form of a two-armed lever 13. The lever 13 is pivotally mounted about the pin 14 disposed on the base plate 2. A spring 15 normally influences the lever 13 into the initial or inoperative position illustrated in FIG. 1 in the drawings. One arm of the lever is constructed in the form of a handle 13a which extends through the slot 1a in the side wall of the shutter housing 1. The other arm 13b of the lever 13 is provided with an offset segment 13c which is so constructed and located as to be engageable with the offset portion 10c of the driving lever 10. The construction and arrangement of the parts is such that when the lever 13 is moved in a counterclockwise direction its lug 13c engages and moves the offset portion 10c of the driving lever 10 whereby the driving lever is moved in a clockwise direction which causes the drive spring 12 to be cocked. Further movement of the driving lever 10 causes the arm 10a thereof to move along the beveled edge of the lug 4a disposed on the shutter blade actuating lever 4 and, ultimately, the arm 10a of the driving lever 10 becomes disengaged from the lug 4a and the driving lever 10 thereupon drops into position behind the said lug. Further movement of the release lever 13 causes the lug 13c to become disengaged from the driving lever 10. Under the influence of spring 12, the driving lever 10 returns to its initial position as illustrated in FIG. 1, which return movement causes the shutter actuating lever 4 to move so as to open the shutter blades 5. When this action occurs, the driving lever is moved out of its engagement with the lug 4a and under the influence of spring 8 the shutter blade actuating lever 4 returns to its initial or starting position to thereby close the shutter blades 5.

It will be understood that after the exposure, the cocking and release lever 13 returns to its initial or rest position as illustrated in FIG. 1. In order to accomplish this result, the offset portion 10c of the driving lever 10 is provided along its upper portion with an oblique surface over which the lug 13c of the lever 13 slides upon the return motion.

With the foregoing construction, certain problems have arisen in that the shutter blades opened upon any inadvertent movement of the cocking and release lever 13 to its return position. As a result, improper exposures have been obtained. In accordance with the present invention, however, means are provided for arresting and maintaining the shutter blade actuating lever 4 in such position that the shutter blades 5 remain closed for a period of time after the cocking and release lever 13 has become completely disengaged from the driving lever 10.

One form of said arresting means is illustrated in the drawings merely for exemplary purposes. It will be understood that means other than those specifically illustrated may be utilized to accomplish the desirable result provided by the present invention. In the illustrative embodiment of the invention, the arresting means is constructed in the form of a two-armed lever 16 carried by the shutter base plate 2 and disposed about pin 17. One arm 16a of the lever 16 is provided with a bent-off lug portion 16b, while the other arm 16c carries an offset extension 16d. A spring 18 normally urges the arresting lever 16 into the position in which it engages the projection 4b provided on the shutter blade actuating lever 4 to maintain the shutter actuating lever in its starting position, as illustrated in FIG. 1, wherein the shutter blades are closed. A stationary, fixed pin 19 maintains the arresting lever 16 in the aforesaid position wherein it contacts the projection 4b. In this position, the offset extension 16d of the arm 16c on the lever 16 is disposed within the path of movement of the cocking and release lever 13 and is engageable by the lug 13c of the cocking and release lever. When the shutter is at rest, the arresting lever prevents movement of the shutter blade actuating lever 4 and the shutter blades 5 are thereby maintained in closed position, as shown in FIG. 1. When the cocking and release lever 13 is moved downwardly from the initial or starting position shown in FIG. 1, the lug 13c impinges upon the driving lever 10 to move the driving lever into the cocked position illustrated in FIG. 2 and in which the arm 10a of the driving lever 10 drops behind the lug 4a of the shutter blade actuating lever 4. As the cocking and release lever 13 continues to be moved downwardly, it becomes disengaged from the driving lever 10. The driving lever 10 thereupon is released for movement under the influence of spring 12 to a position where it engages the lug 4a of the shutter blade actuating lever 4. However, this engagement causes no movement of the shutter blade actuating lever 4 for the reason that the shutter blade actuating lever 4 is restrained by the engagement of the projection 4b with the bent-off lug 16b of the arresting lever 16. As the cocking and release lever 13 continues to move beyond its engagement with the driving lever 10, its lug 13c strikes the offset extension 16d on the arresting lever 16 causing the arresting lever to pivot about pin 17 in a clockwise direction. This pivotal or swinging movement of the arresting lever 16 results in the disengagement of the bent-off lug 16b from the projection 4b of the shutter blade actuating lever 4. Thereupon, the heretofore described influence of the driving lever 10, acting upon the lug 4a of the shutter blade actuating lever 4, causes the lever 4 to be moved in a counterclockwise direction. During this movement, the shutter blades 5 are opened. At this time, the driving lever 10 becomes disengaged from the lug 4a and the shutter blade actuating lever 4 reciprocates and returns to its initial or starting position simultaneously causing the closing of the shutter blades 5.

FIG. 4 illustrates the various positions of the cocking and release lever 13 as it first operatively engages and then disengages the driving lever 10 and the arresting lever 16. In the position indicated by the designation I, the driving lever has reached the active position illustrated in FIG. 2 during the cocking process. The position designated as II illustrates the position of the lever 13 at the time when the offset segment 13c becomes disengaged from the offset end portion 10c of the driving lever 10. The position designated as III illustrates the position of the cocking and release lever 13 at the time when the arresting lever 16 becomes disengaged from the shutter blade actuating lever 4.

In moving from the position designated by I to the position designated II, the cocking and release lever 13 travels over the angular path a. During this travel the cocking and release lever 13 moves the driving lever 10 in a clockwise direction from the active position illustrated in FIG. 2. It will be noted that when the cocking and release lever 13 is disengaged from the driving lever 10, the driving lever moves over an "idle" of inactive path until the arm 10a of the driving lever 10 impinges the lug 4a of the shutter blade actuating lever 4.

In its movement from the position designated II to the position designated III, the cocking and release lever travels over angular path B. Therefore, after the cocking lever 13 has become disengaged from the driving lever 10, the cocking lever travels a distance of determined length until the arresting lever 16 is moved out of engagement with and releases the shutter blade actuating lever 4. The angular paths a and B of the cocking and release lever 13 are such that they prevent any effect on the operation of the shutter which might otherwise be caused by errors in tolerance in the mass production of the respective parts. Thereby there is no need for any special adjustments to be made for the respective parts. In addition, in accordance with the present invention, the arresting lever 16 has no direct relationship to or operative engagement with the driving lever 10 and cooperates with the shutter blade actuating lever completely independently of the driving lever 10. This construction provided by the present invention enables the use of the "safety" paths of the cocking and release lever 13 to thereby eliminate any influence which might otherwise be caused by the tolerances of the parts.

The self cocking shutter constructed in accordance with the present invention provides mechanism which is both completely dependable in operation and extremely economical to manufacture. The present invention eliminates any inadvertent exposures heretofore caused by inadvertent return movement of the cocking and release device. There is no necessity with the use of the present invention for any special adjustment of the various parts of the cocking and drive mechanism of the shutter itself.

While the invention has been described for illustrative purposes in specific detail, it will be understood that the embodiment so illustrated is only exemplary of the means which may be utilized to accomplish the specified result. Therefore, variations and modifications are within the scope of the present invention as defined in the appended claims.

We claim:

1. A photograph self-cocking shutter construction comprising a cocking and release device, a driving member adapted to be actuated by said cocking and release device, shutter blades, a shutter blade actuator movable in response to movement of said driving member for actuating the shutter blades, the said driving member being disposed in the path of said cocking and release device so as to be in response to movement of the cocking and release device into engagement with the shutter blade actuator, and movable arresting means adapted to engage the shutter blade actuator for preventing movement of the shutter blade actuator prior to movement of the arresting means, the said arresting means including a two arm lever having one arm normally engaging said shutter blade actuator to prohibit unintentional actuation thereof and having its other arm disposed in the path of movement of said cocking and release device so as to be movable in response to the continued movement of the cocking and release device to release the shutter blade actuator whereby the shutter blade actuator actuates the shutter blades only after the connection between the driving member and shutter blade actuator has been established and the cocking and release device has been removed from engagement with the driving member.

2. A photographic self-cocking shutter construction comprising a cocking and release device, a driving member, shutter blades, a shutter blade actuator movable in response to movement of said driving member for actuating the shutter blades, the said driving member being disposed in the path of said cocking and release device so as to be movable in response to movement of the cocking and release device into engagement with the shutter blade actuator, and movable arresting means adapted to engage the shutter blade actuator for preventing movement of the shutter blades prior to movement of the arresting means, the said arresting means including a two-armed lever having one arm normally engaging said shutter blade actuator to prohibit unintentional actuation thereof and having its other arm disposed in the path of movement of said cocking and release device so as to be movable in response to movement of the cocking and release device only after the cocking and release device has become disengaged from the driving member whereby the arresting means release the shutter blade actuator to thereby actuate the shutter blades.

3. A photographic self-cocking shutter construction comprising a cocking and release device, a driving member, shutter blades, a shutter blade actuator movable in response to movement of said driving member for actuating the shutter blades, the said driving member being movable in response to movement of the cocking and release device into positive engagement with the shutter blade actuator and a two-armed movable arresting lever for preventing the movement of the shutter blade actuator prior to movement of the arresting lever, the first arm of said two-armed lever engaging the shutter blade actuator and the second arm of said two-armed lever being movable in response to movement of the said cocking and release device, whereby movement of said second arm of the arresting lever causes the first arm to release the shutter blade actuator to thereby actuate the shutter blades.

4. A photographic self-cocking shutter construction comprising a cocking and release device, a movable driving means, a shutter blade actuator and shutter blades, said driving means being first movable in a cocked position and secondly move the said shutter blade actuator to actuate the shutter blades, including a movable arresting member, said arresting lever including a two arm lever, one arm of said lever normally engaging said shutter blade actuator to arrest accidental movement thereof, and the other arm of said arresting lever being disposed in the path of movement of said cocking and release device, said driving means including a lever disposed in a path of movement of said cocking and release device, and said driving means lever being disposed relative to said arresting lever and said cocking and release device so that the latter will first engage the said driving lever to actuate said shutter blade actuator and then only engage said other arm of the arresting lever to effect release of said shutter blade actuator and shutters operated thereby.

5. A photographic self-cocking shutter construction comprising:
 (a) a housing having a slot formed therein,
 (b) a base plate mounted in said housing,
 (c) shutter blades pivotally mounted on said base plate for movement between open and closed positions,
 (d) a shutter blade actuator operatively connected to said shutter blades,
 (e) a spring means acting on said actuator for maintaining said shutter blades in a normally closed position,
 (f) a cocking and release device pivotally mounted on said base plate,
 (g) said cocking and release device including a lever having one end thereof extending through said slot,
 (h) a driving member pivotally connected to said base plate, said driving member being operatively associated between said cocking and release device and said shutter blade actuator whereby said actuator is movable in response to the movement of said driving member for actuating the shutter blades,
 (i) and an arresting means normally arresting the movement of said actuator,
 (j) said arresting means including a two-arm lever having one arm thereof normally arresting said actuator and the other arm thereof disposed in the path of movement of said cocking and release lever whereby said arresting means is actuated by said cocking and release device to release said actuator only after the connection between said driving member and said actuator has been established and the cocking and release lever has been removed from engagement with said driving member.

6. A photographic self-cocking shutter construction comprising:
   (a) a cocking and release device,
   (b) a driving member,
   (c) shutter blades,
   (d) a shutter blade actuator movable in response to the movement of said driving member for actuating the shutter blades, said driving member being disposed in the path of movement of said cocking and release device upon the operation thereof,
   (e) and a movable arresting lever,
   (f) said arresting lever including a two arm lever having one arm normally engaging the shutter blade actuator for prohibiting unintentional actuation of the shutter blade actuator,
   (g) and the other arm of said arresting lever being located in the path of movement of said cocking and release device so that said cocking and release device will actuate said arresting lever only after the driving lever has engaged the shutter blade actuator due to the actuation of said arresting lever by said cocking and release device.

References Cited by the Examiner

UNITED STATES PATENTS

| | | | |
|---|---|---|---|
| 2,249,517 | 7/1941 | Crumrine | 95—59 |
| 2,731,895 | 1/1956 | McKee | 95—60 |

JOHN M. HORAN, *Primary Examiner.*

NORTON ANSHER, *Examiner.*